(No Model.) 5 Sheets—Sheet 1.
A. S. ADLER.
SHOE MAKER'S MEASURE.
No. 428,875. Patented May 27, 1890.
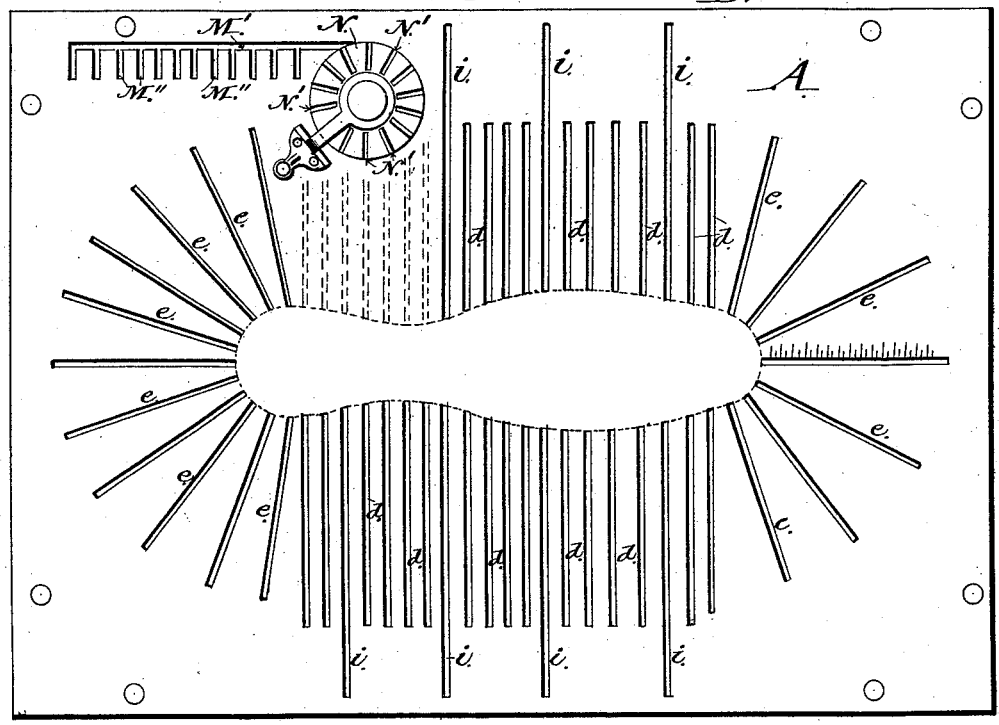
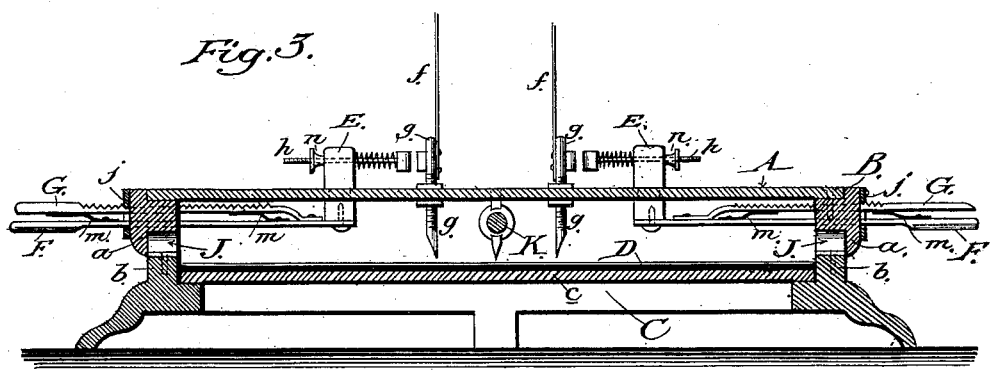
WITNESSES
T. W. Fowler
W. H. Patterson
INVENTOR
Abraham S. Adler,
by A. H. Evans & Co
Attorneys (No Model.) 5 Sheets—Sheet 2.
A. S. ADLER.
SHOE MAKER'S MEASURE.
No. 428,875. Patented May 27, 1890.
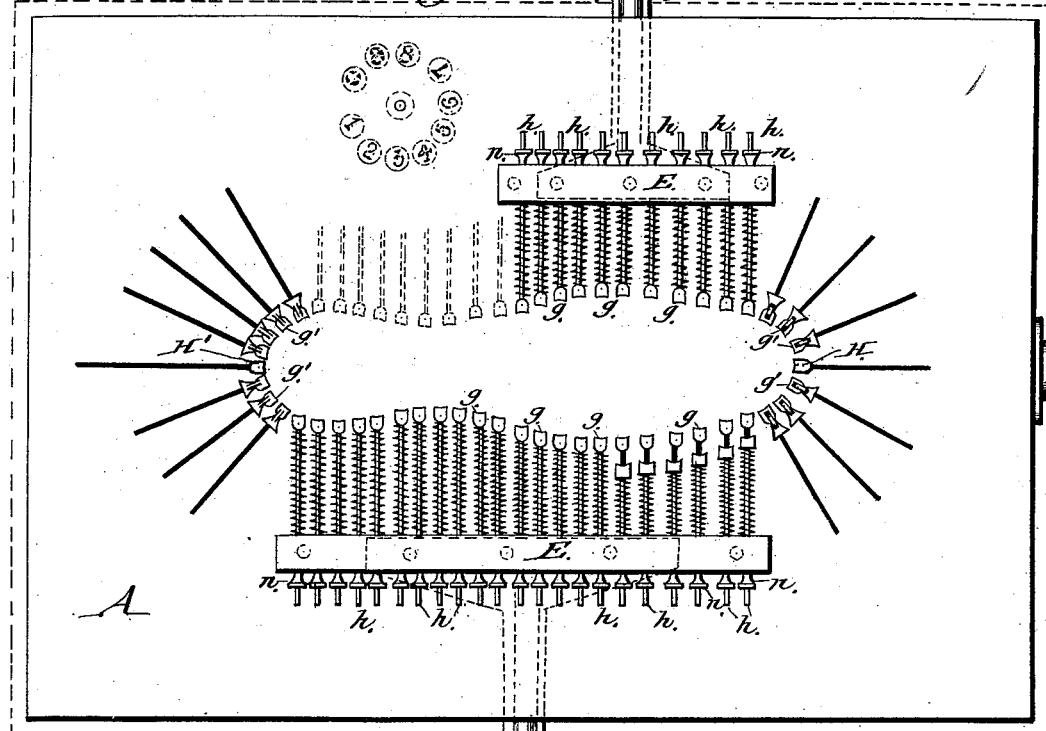
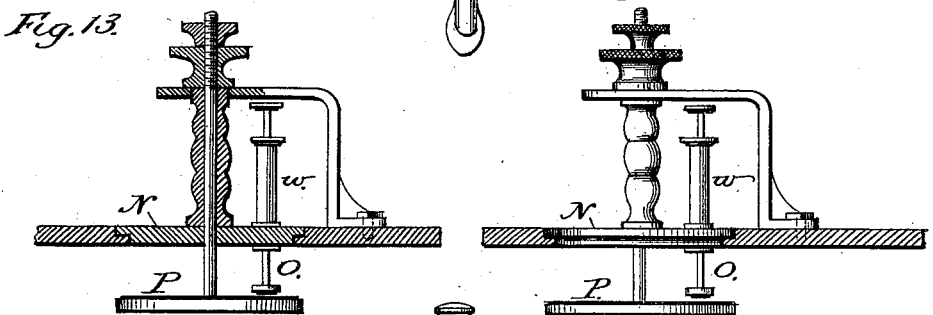
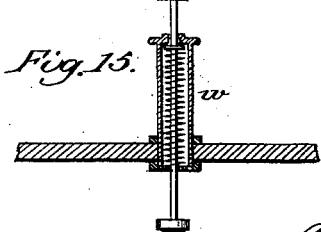
WITNESSES
T. W. Fowler
W. H. Patterson
INVENTOR
Abraham S. Adler,
by A. H. Evans & Co.
Attorneys (No Model.) 5 Sheets—Sheet 3.
A. S. ADLER.
SHOE MAKER'S MEASURE.
No. 428,875. Patented May 27, 1890.
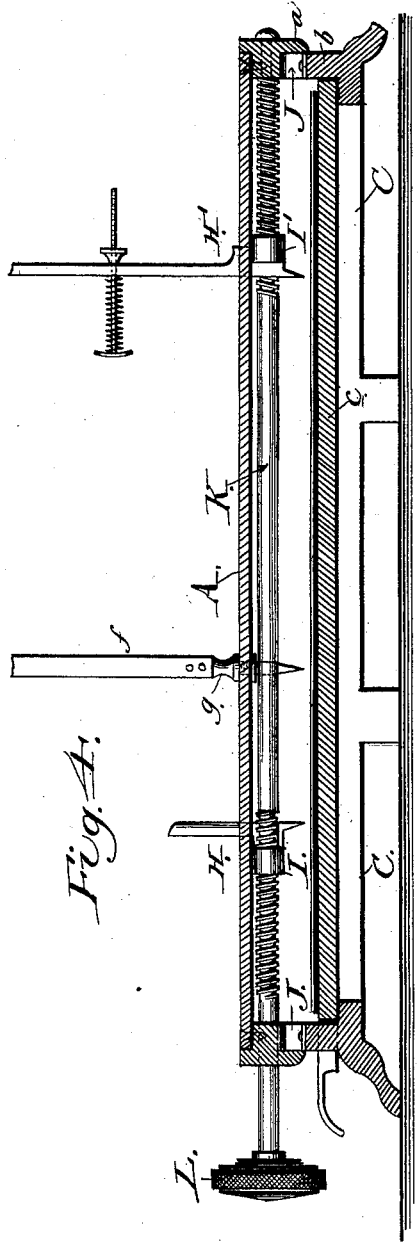
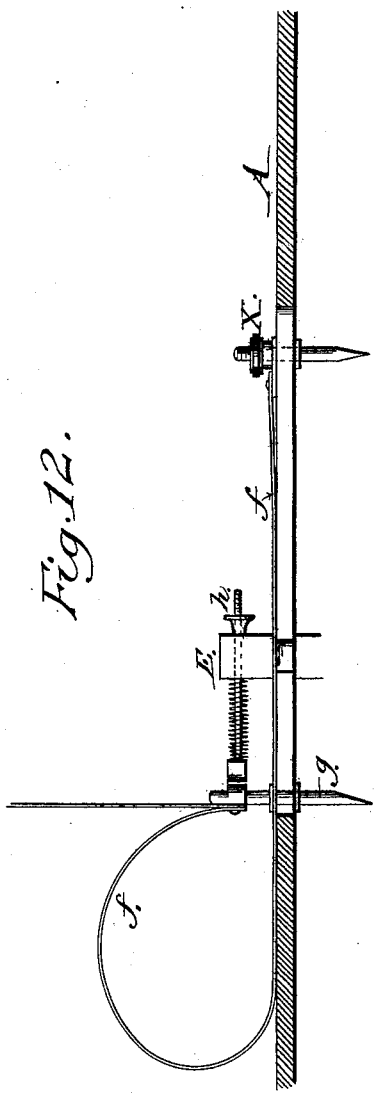
WITNESSES
P. W. Fowler,
W. H. Patterson
INVENTOR
Abraham S. Adler,
by A. H. Evans & Co.
Attorneys (No Model.)
A. S. ADLER.
SHOE MAKER'S MEASURE.
No. 428,875. Patented May 27, 1890.
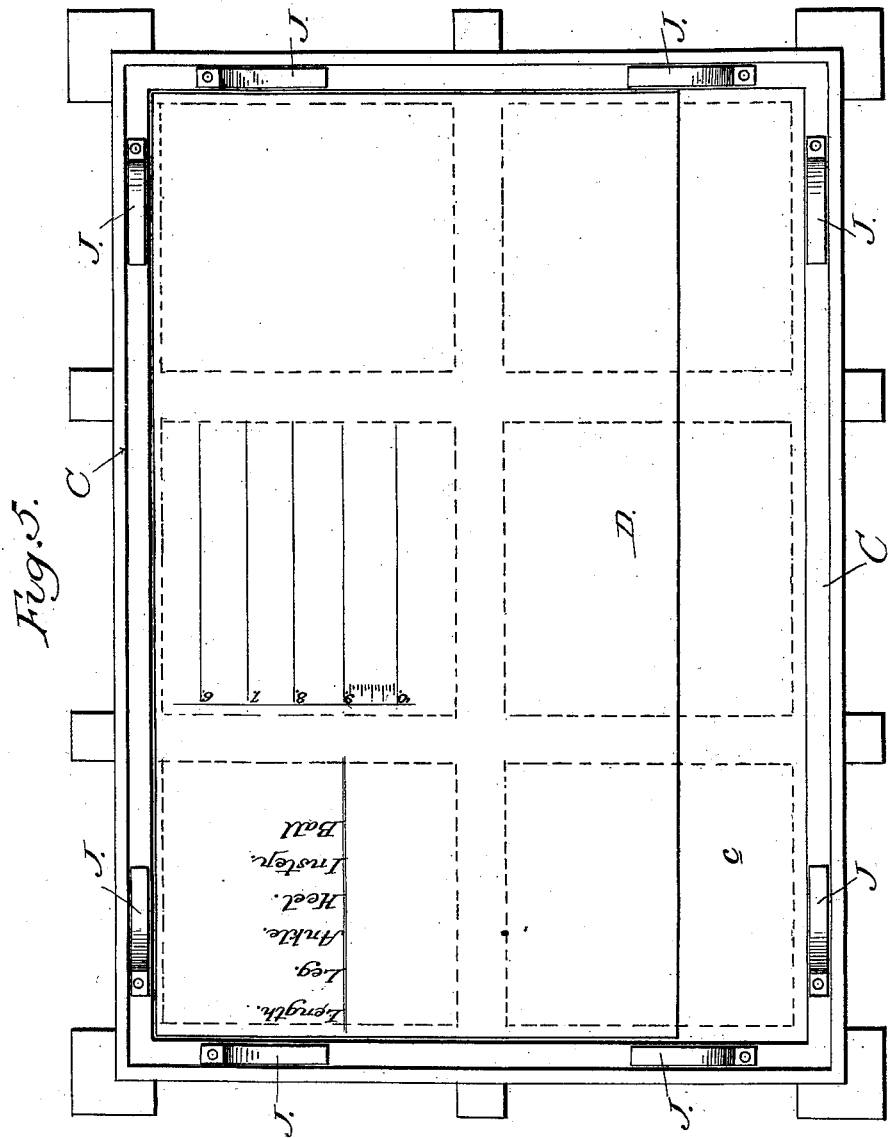

(No Model.) 5 Sheets—Sheet 5.
A. S. ADLER.
SHOE MAKER'S MEASURE.
No. 428,875. Patented May 27, 1890.
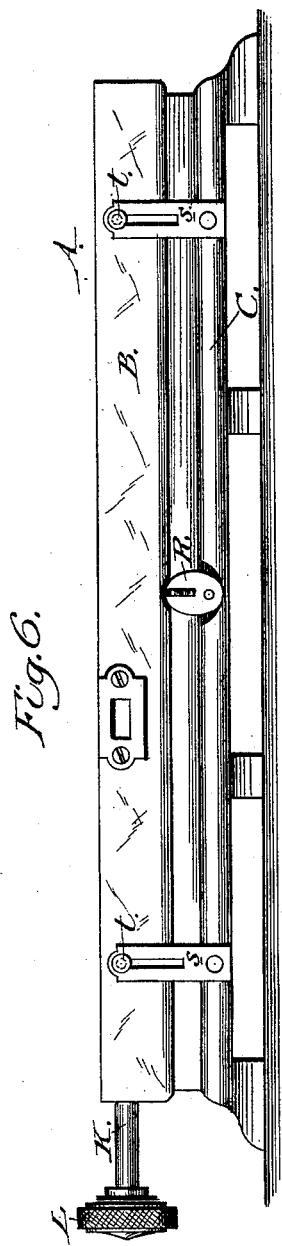
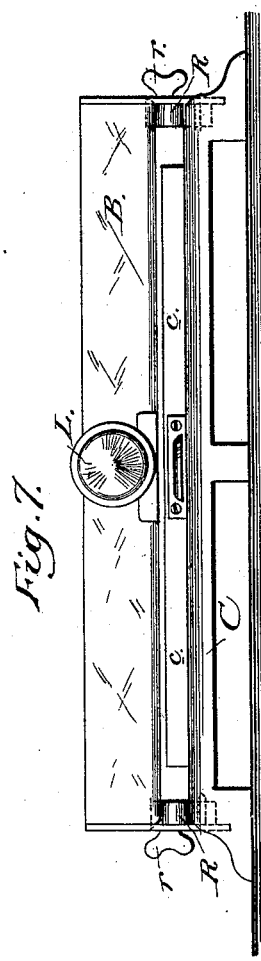
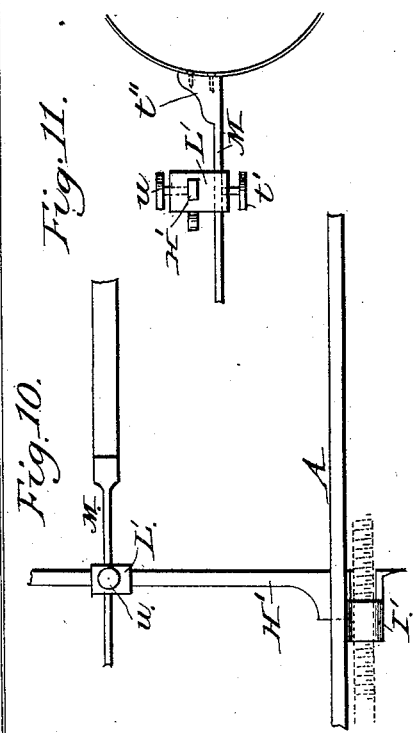
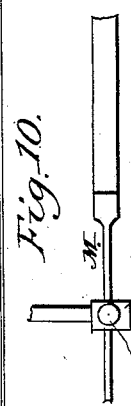
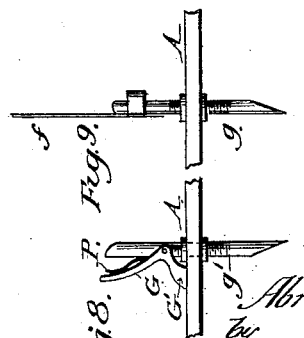
WITNESSES
T. W. Fowler,
W. H. Patterson
INVENTOR
Abraham S. Adler.
by A. H. Evans & Co
Attorneys

UNITED STATES PATENT OFFICE.

ABRAHAM S. ADLER, OF BALTIMORE, MARYLAND.

SHOE-MAKER'S MEASURE.

SPECIFICATION forming part of Letters Patent No. 428,875, dated May 27, 1890.

Application filed August 23, 1889. Serial No. 321,776. (No model.)

*To all whom it may concern:*

Be it known that I, ABRAHAM S. ADLER, a citizen of the United States, residing at Baltimore, in the State of Maryland, have invented certain new and useful Improvements in Shoe-Makers' Measures, of which the following is a full and clear description, reference being had to the accompanying drawings, forming part of this specification, in which—

Figure 1 represents a plan view of the slotted bed-plate. Fig. 2 is a similar view showing the arrangement of spring-pins and the means for adjusting the side pins. Fig. 3 is a sectional view taken transversely through the machine. Fig. 4 is a longitudinal sectional view of the same, showing the screw with right and left threads and the heel and toe pieces which are actuated thereby. Fig. 5 is a plan view of the base, showing a paper or other diagram in position, and showing also the springs or cushions which are located between the base and bed-frame. Fig. 6 is a side view of the base and bed-frame, showing the slotted plates and one of the eccentrics for moving the bed-frame and its adjuncts vertically. Fig. 7 is a front view of the bed-frame and base, showing the eccentrics at the sides. Figs. 8 to 11, inclusive, are details to be referred to. Fig. 12 is a detail showing one of the spring-pins, the measuring-strap which passes around the foot, and disclosing also the pin which indicates upon the diagram the desired measure. Figs. 13, 14, and 15 illustrate a means for printing or stamping the several adjustments upon the diagram shown in Fig. 5.

My invention relates to certain new and useful improvements in measuring devices for shoe-makers' use, by which the conformation of the foot is readily taken and the shape, size, and other data preserved for future use; and my invention consists in the several constructions, arrangements, and combinations of devices which I shall hereinafter fully describe and claim.

To enable others skilled in the art to make and use my invention, I will now describe the same and indicate the manner in which I carry it out.

In the drawings, A represents the top or bed plate of the bed-frame B, whose side flanges $a$ overlap the flanges $b$ of the base C, as shown in Fig. 4, the said base C having also a top plate $c$, which serves as an impression-plate, upon which is placed above a felt or other pad a sheet of paper or fabric D, which may be provided with lines and numbers or other characters, forming a diagram substantially like that which is shown in my former patent, No. 322,238, dated July 14, 1885.

The top or bed plate A is formed with a number of elongated slots, some of which $d$ are parallel and extend transversely of the plate, and they are so arranged that their inner end walls describe the contour of the sides of a human foot, as shown by the dotted line in Fig. 1.

Near each end of the plate A are the radially-arranged slots $e$, whose inner walls complete the contour of the foot, as shown, and in these slots, and also in the slots $d$, are passed the shanks of pointed pins $g\ g'$, as shown in Figs. 8 and 9, any one or more of which on each side may be secured to any well-known form of measuring-strap $f$. The pins $g'$ are independent of each other, and they engage the radial slots at the heel and toe portions of the bed-plate, and the pins $g$ may also be independent ones, as shown in Fig. 2, or they may be formed as a part of or may be securely fixed to horizontally-arranged spring-actuated rods $h$, which pass through a longitudinally-arranged bar E, which works freely in the long slots $i$ in said bed-plate and is connected with a pull-rod F, that extends outwardly beyond the outer sides of the apparatus, where it may be readily grasped by the operator. This pull-rod F has connected with it a ratchet-bar G, which extends parallel with the pull-rod, and has its teeth adapted for engagement with a fixed plate $j$, secured to the outer side of the bed-frame, as shown in Fig. 3, and serving as a pawl to secure the bar E and its pins when the rod F has been pulled outward the desired distance, the said ratchet-bar being held to its engagement with the pawl by means of suitable springs $m$, as shown in Fig. 3.

One of the bars E, with its pull-rod and ratchet-bar, and one of the pawls, are located upon each side of the machine, (see Fig. 3,) and the bars E are so connected with the pins that the whole series of pins upon each side is moved laterally in the slots $d$ by pulling out or pushing in of the pull-rods. If the pins $g$ are made independent of the spring-actuated rods $h$, the latter will have heads on their inner ends to fit against the back of the pins, as shown in Figs. 2 and 3, and the heads of the rods $h$ will normally lie slightly behind the pins, so that all of the latter may be adjusted forward against the inserted foot by pushing in the rods F. I prefer, however, to form the rods $h$ and pins as of one piece, so that the pins will all be moved by the movement of the pull-rods, and will not have to be moved by an independent motion and each pin moved separately, as when they are independent thereof, for in the first case the whole series of pins is moved toward and from the foot by simply moving the pull-rods in and out. Suitable coiled springs are placed upon the rods $h$, and the tension of these springs is regulated by nuts $n$, engaging the threaded outer ends of the rods and bearing against the bars E.

The pins $g'$ at the toe and heel portions of the bed-plate are independent ones, and they are moved back and forth in their slots by hand, the said pins having pivoted to them a lever Z, provided with a foot portion Z', which rests against the top surface of the bed-plate, and is held in frictional contact therewith by means of a spring P acting against the long arm of the lever. By this means the pins $g$ may be slipped forward against the toe and heel of the foot and held by the friction of the foot portion Z' against the bed-plate; but when these pins are to be moved outwardly the levers Z are depressed, so as to raise their foot portions from the bed-plate. In the center slot at the toe and also at the heel portion of the bed-plate is a toe and heel piece H and H', respectively, for taking the size or length of the foot, one or both of said pieces being used in conjunction with a suitable scale or measure upon the bed-plate. These pieces H and H' project below the bed-plate and are formed with internally-threaded sleeves I and I', which engage the right and left threads formed upon the opposite ends of the screw K, that extends longitudinally along the under side of the bed-plate and is provided with a hand-wheel L, which when turned operates the screw and causes the heel and toe pieces to move in opposite directions toward or from the toe and heel portions of the foot. The toe and heel pieces H and H', like the pins $g$ and $g'$, have their lower ends pointed, for a purpose to be hereinafter stated.

The connection between the bed-frame and the base is a yielding one. In other words, springs or cushions J are introduced between the base and bed-frame, and may normally hold the latter in a slightly-elevated position, so that the points of the pins $g$ $g'$ and the heel and toe pieces H H' are slightly above the diagram or sheet on the impression-plate $c$. From this description it will be observed that when the diagram is in position and the pins are all adjusted to the shape of the foot a pressure upon the bed-plate by the inserted foot will depress said plate and cause the points of the pins to puncture the paper sheet or diagram, and thereby give a correct outline of the foot.

I do not depend upon the springs or cushions J to hold the bed-plate elevated, but prefer a more positive means, such as the eccentrics R, pivoted at the sides of the base, as shown in Figs. 6 and 7. These eccentrics have finger-pieces $r$, by which they may be turned, and the base C is provided with upwardly-extending slotted plates $s$, through which pins $t$ on the bed-frame project, whereby said frame is guided in its vertical movements.

By the use of the eccentrics the bed-frame may be lifted above the base and held in a practically rigid position until the desired measure has been taken, when the eccentrics may be turned to release the bed-frame from its elevated position to permit the said frame to be pressed down and the points of the several pins to pierce the paper in the manner previously described.

The heel-piece H' has fitted upon it a block L', which is adjustable vertically upon said piece by means of a set-screw $u$, and this block L' is perforated transversely to receive the shank of a sliding rod M, which is adjustably held by a set-screw $t'$, (see Figs. 10 and 11,) the said rod carrying at its inner end a curved plate $t''$, which is adapted to fit in the hollow in the back of the foot just above the heel, and having a strap by which the ankle measurement is taken.

From the foregoing description it will be seen that when the foot is placed upon the bed-plate and the pins and attachments are adjusted against it the several parts of the foot may be accurately determined, as previously described, and the outline of the foot impressed upon the underlying paper diagram by the points of the pins piercing the same.

In Fig. 12 I show a means for securing one of the straps $f$, which takes the measurement around the foot, the said strap being secured to the inner sides of one of the spring-pins, and, after being passed around the foot, is extended along the upper side of the bed-plate and has its outer end removably secured to a pin X, which works in the slots in the bed-plate and has a pointed end which indicates upon the underlying diagram the exact measure of this part of the foot.

To preserve the measurements for future use, I prefer to use in connection with this apparatus a printing or stamping device, which will imprint or impress the desired measure upon the diagram at designated points, and thus obviate the inconvenience and uncertainty of writing these measurements by pencil or otherwise. A means for accomplishing this desired result is shown in Figs. 1 and 2 and 13 to 15, inclusive; but the specific construction is not claimed in this application, as it forms the subject-matter of another application, filed of even date herewith, Serial No. 321,775. In carrying out this part of my invention I form in the bed-plate, near the side thereof, a longitudinal slot M′, with transverse slots M″ intersecting the main slot, and I mount in the bed-plate upon a vertical axis a disk N, having radial slots N′, in which the sleeves w of suitable removable dies O are seated, the said dies carrying numbers or other characters on their faces, while their stems, which enter the sleeves w, are encircled by springs which retract each die after its character has been stamped upon the diagram or sheet. An inking-pad P is suitably supported below the dies and inks the faces of the dies when the latter are pressed upon it.

The diagram before mentioned will have printed upon it suitable words—such as "Length," "Leg," "Ankle," "Heel," "Instep," "Ball," &c., and when this diagram is placed in position these words will be opposite the short transverse slot M′ in the bed-plate. Now it will be seen that when any part of the foot is measured the disk N will be turned on its axis until the die which carries the number corresponding with the figure on the measuring-strap aligns itself with the longitudinal slot M′ in the bed-plate. The die is now slipped out of its slot in the wheel and pushed along the slot M′ until it meets the transverse slot opposite the word on the diagram corresponding with the part of the foot just measured, and it is then slipped into this transverse slot and the desired number or character impressed or imprinted upon the diagram by pressing the die downward, the spring in the sleeves thereof raising the face of the die from the diagram when the pressure is released. The die may now be slipped back into its radial slot in the disk and another part of the foot measured and stamped upon the diagram at the proper point in the manner previously described.

Having thus described my invention, what I claim as new, and desire to secure by Letters Patent, is—

1. In a shoe-maker's measure, a bed-plate having a series of slots formed therein whose combined inner walls approximate the shape of a human foot.

2. In a shoe-maker's measure, a bed-plate having radial slots at the toe and heel portions, in combination with independent spring-actuated pins fitting said slots, substantially as described.

3. In a shoe-maker's measure, a bed-plate having the transverse parallel slots at the sides and radial slots at the heel and toe portions, in combination with pins fitted to be moved along said slots, substantially as described.

4. In a shoe-maker's measure, a bed-plate having the transverse parallel slots at the sides, in combination with the bars E, and rods connected therewith for moving the bars in and out, and pins working in the slots and fitting the curves of the foot, substantially as described.

5. In a shoe-maker's measure, a bed-plate having parallel transverse slots at the side portions and radial slots at the toe and heel portions, in combination with pins fitting said slots and adapted to be moved up against the foot, substantially as described.

6. In a shoe-maker's measure, the slotted bed-plate, in combination with pins fitting in the slots therein, rods connected with the pins, the bars E, in which the rods are mounted, springs upon the rods, and nuts for adjusting the tension of the springs, substantially as described.

7. In a shoe-maker's measure, the slotted bed-plate and the bars E, carrying spring-pins, which are adapted to move along the slots in the bed-plate, in combination with pull-rods connected with the bars and a pawl and rack for holding the rods, substantially as described.

8. In a shoe-maker's measure, a slotted bed-plate, the spring-pins, and measuring-straps attached to said pins, in combination with the bars E, pull-rods connected with said bars, a rack-bar carried by the pull-rod, and a fixed pawl adapted to engage the rack, substantially as and for the purpose described.

9. In a shoe-maker's measure, the bed-plate having radial slots at the heel and toe portions, in combination with pins fitting said slots and provided with levers which engage the bed-plate and secure the pins in their adjusted positions, substantially as described.

10. In a shoe-maker's measure, the slotted bed-plate and the pins working therein, in combination with levers pivoted to the pins and having foot portions which bear against the bed-plate and spring behind the levers, substantially as described.

11. In a shoe-maker's measure, the combination, with the stationary base, of a vertically-moving bed-plate carrying pins and adapted to be moved downward by the pressure of the inserted foot to mark the outline of said foot.

12. In a shoe-maker's measure, the combination, with the base, of a bed-plate above the base, springs or cushions between the bed-plate and base, pins carried by the bed-plate for marking the outline of the foot, the slotted plates for guiding the movement of the bed-plate, and means for holding the bed-plate temporarily elevated, substantially as described.

13. In a shoe-maker's measure, the base, a vertically-moving bed-plate carrying spring-pins, springs or cushions between the base and bed-plate, and slotted plates for guiding the bed-plate in its movements, in combination with eccentrics at the side of the base and bearing under the bed-plate, said eccentrics being provided with finger-pieces by which they may be turned, substantially as described.

14. In a shoe-maker's measure, the base, the slotted bed-piece, and a screw having right and left threads, in combination with the heel and toe pieces fitted to move in the slotted bed-plate and having threaded sleeves for the screw and pointed lower ends, substantially as described.

15. In a shoe-maker's measure, the slotted bed-plate having a screw, in combination with a heel-piece actuated by the screw, a block adjustable on said heel-piece, and a rod adjustably carried by the block and having a curved plate at its inner end, said plate carrying a measuring-strap, substantially as described.

16. In a shoe-maker's measure, the slotted bed-plate, the pins adapted to move in the slots therein, and a suitable diagram, in combination with a measuring-strap secured to said pins and the pins X, working in the slots and removably securing one end of the straps, substantially as described.

ABRAHAM S. ADLER.

Witnesses:
JAMES E. FARRELL,
SIMON ROSENBURG.